US008909711B1

(12) United States Patent
Staddon et al.

(10) Patent No.: US 8,909,711 B1
(45) Date of Patent: Dec. 9, 2014

(54) SYSTEM AND METHOD FOR GENERATING PRIVACY-ENHANCED AGGREGATE STATISTICS

(75) Inventors: Jessica Staddon, Redwood City, CA (US); Pavani Naishadh Diwanji, Los Gatos, CA (US); Moti Yung, New York, NY (US); Daniel Dulitz, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 582 days.

(21) Appl. No.: 13/169,774

(22) Filed: Jun. 27, 2011

Related U.S. Application Data

(60) Provisional application No. 61/479,678, filed on Apr. 27, 2011.

(51) Int. Cl.
*G06F 15/16* (2006.01)

(52) U.S. Cl.
USPC ............ 709/205; 709/204; 709/206; 709/207

(58) Field of Classification Search
USPC .......................................................... 709/205
See application file for complete search history.

(56) References Cited

U.S. PATENT DOCUMENTS 6,130,938 A 10/2000 Erb
6,192,119 B1 2/2001 Wilson
6,697,478 B1 2/2004 Meldrum et al.
6,754,322 B1 6/2004 Bushnell
7,106,848 B1 9/2006 Barlow et al.
7,366,990 B2 4/2008 Pitroda
7,555,110 B2 6/2009 Dolan et al.
7,610,287 B1 10/2009 Dean et al.
7,630,986 B1 * 12/2009 Herz et al. ............................ 1/1
7,742,468 B2 6/2010 Vagelos
8,073,733 B1 * 12/2011 Caland ......................... 705/14.4
2002/0120653 A1 * 8/2002 Kraft et al. .................... 707/529
2002/0137490 A1 9/2002 Gallant
2002/0143874 A1 10/2002 Marquette et al.
2004/0128224 A1 * 7/2004 Dabney et al. ................. 705/37

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Glenton B Burgess
*Assistant Examiner* — Angela Nguyen
(74) *Attorney, Agent, or Firm* — Patent Law Works LLP

(57) ABSTRACT

A system and method for generating privacy-enhanced aggregate statistics within a social network system is provided. Data is collected and processed to gather information to generate the aggregate statistics. A threshold is assigned. The threshold includes a criterion used in making a determination on what aggregate statistic will be generated. In some embodiments, the threshold is a numerical value. In some embodiments, the numerical value, or quantitative data is then translated into qualitative descriptors. In some embodiments, noise is then added to randomize the assigned threshold. In other embodiments, noise is added to the collected data. In some embodiments, checks to guard against attacks from adversarial users are performed. Examples of indications of adversarial behavior include, but are not limited to, manipulation of profiles, continuous manipulation of affinity groups, and manipulation of preferences for one or more users. The threshold is applied and aggregate statistics are generated.

23 Claims, 8 Drawing Sheets

(56) References Cited

U.S. PATENT DOCUMENTS

| | | | | |
|---|---|---|---|---|
| 2004/0258220 | A1 | 12/2004 | Levine et al. | |
| 2005/0152521 | A1 | 7/2005 | Liljestrand | |
| 2006/0026288 | A1 | 2/2006 | Acharya et al. | |
| 2006/0077957 | A1 | 4/2006 | Reddy et al. | |
| 2006/0206604 | A1 | 9/2006 | O'Neil et al. | |
| 2007/0127631 | A1 | 6/2007 | Difiglia | |
| 2007/0171898 | A1 | 7/2007 | Salva | |
| 2007/0173236 | A1 | 7/2007 | Vishwanathan et al. | |
| 2007/0248077 | A1 | 10/2007 | Mahle, Jr. et al. | |
| 2008/0056475 | A1 | 3/2008 | Brannick et al. | |
| 2008/0192656 | A1 | 8/2008 | Vagelos | |
| 2011/0098156 | A1 | 4/2011 | Ng et al. | |
| 2011/0283099 | A1* | 11/2011 | Nath et al. | 713/150 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Dwork, "Differential Privacy in New Settings," Microsoft Research, 2010, pp. 174-183.

* cited by examiner

SYSTEM AND METHOD FOR GENERATING PRIVACY-ENHANCED AGGREGATE STATISTICS

This application claims the benefit of U.S. Provisional Application No. 61/479,678, entitled "System and Method for Privacy-Enhanced Aggregate Statistics" filed Apr. 27, 2011, the entire contents of which are herein incorporated by reference.

The present specification relates to social networks. In particular, the present specification relates to generating statistical information in a social network, and specifically to generating privacy-enhanced aggregate statistics in a social network.

BACKGROUND

Today's online retailers and social network services provide statistics about the user population for the purpose of making recommendations or for locating affinity groups. For example, a well-known online retailer offers statistical information on the products they have for sale. To illustrate, when a customer views a particular item on the online retailer's website, the website also displays products that other viewers of that particular item also viewed. As another example, a popular social network service provides statistical information about the size of a user's extended network and partial or complete paths to other users who are not in the user's immediate network. As yet another example, another popular social network website provides statistical information about the number of users who have indicated a preference for particular content that is being displayed within the social network.

Oftentimes, identities of users who have made the preference indications are revealed in association to the statistical information displayed. For example, a statistic may reveal that four people prefer a particular news article that has been posted and a mouse-over on the statistical information may reveal who exactly preferred the news article. This may discourage users from indicating their preferences if they do not want other users to know their preferences. Additionally, this statistical information is presented as numerical values. Adversarial users who are attempting to identify the users who are associated with the numerical value may perform various actions to modify user data in the social network in an attempt to determine the identity of users and their preferences. Therefore, what is needed is a method to protect the privacy of users making inputs into an online system.

SUMMARY OF THE INVENTION

The deficiencies and limitations of the prior art are overcome at least in part by providing a system and method for generating privacy-enhanced aggregate statistics within a social network system. An embodiment provides a system for generating privacy-enhanced aggregate statistics within a social network system. The system includes a processor and at least one module, stored in the memory and executed by the processor. The module including instructions for: collecting data; assigning a threshold; adding noise; generating an aggregate statistic; and sending the aggregate statistic for display. According to some embodiments, the aggregate statistic includes the qualitative descriptor. In one embodiment, noise is added to the assigned threshold to randomize the assigned threshold. In other embodiments, noise is added to the collected data. The collected data includes information related to user inputs in a social network system. In some embodiments, the module includes instructions for translating the quantitative value into a qualitative descriptor. The threshold includes a criterion that will be used in making a determination on generation of the aggregate statistic and is the criterion associated with a quantitative value.

An embodiment provides a method for generating privacy-enhanced aggregate statistics within a social network system. Data is collected and processed in order to gather information to generate the aggregate statistics. At least one threshold is assigned. The threshold includes a criterion that is used in making a determination on what aggregate statistic will be generated. In some embodiments, the threshold is a numerical value. In one embodiment, the numerical value, or quantitative data is then translated into qualitative descriptors. Examples of such descriptors include, but are not limited to, "few," "some," "several," "most," "many," "at least a quarter," "about half of," and "greater than X %." In some embodiments, noise is then added to randomize the assigned threshold. In other embodiments, noise is added to the quantitative value. In some embodiments, checks to guard against attacks from adversarial users are performed. Examples of indications of adversarial behavior include, but are not limited to, manipulation of profiles, continuous manipulation of affinity groups, and manipulation of preferences for one or more users. The threshold is applied and aggregate statistics are generated.

Yet another embodiment, a graphical user interface for displaying privacy-enhanced aggregate statistics is disclosed. In one embodiment, the aggregate statistic information is generated and displayed on a portion of a user's social network webpage. In another embodiment, the aggregate statistic information is generated and sent for display as a pop-up window on a user's social network webpage.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
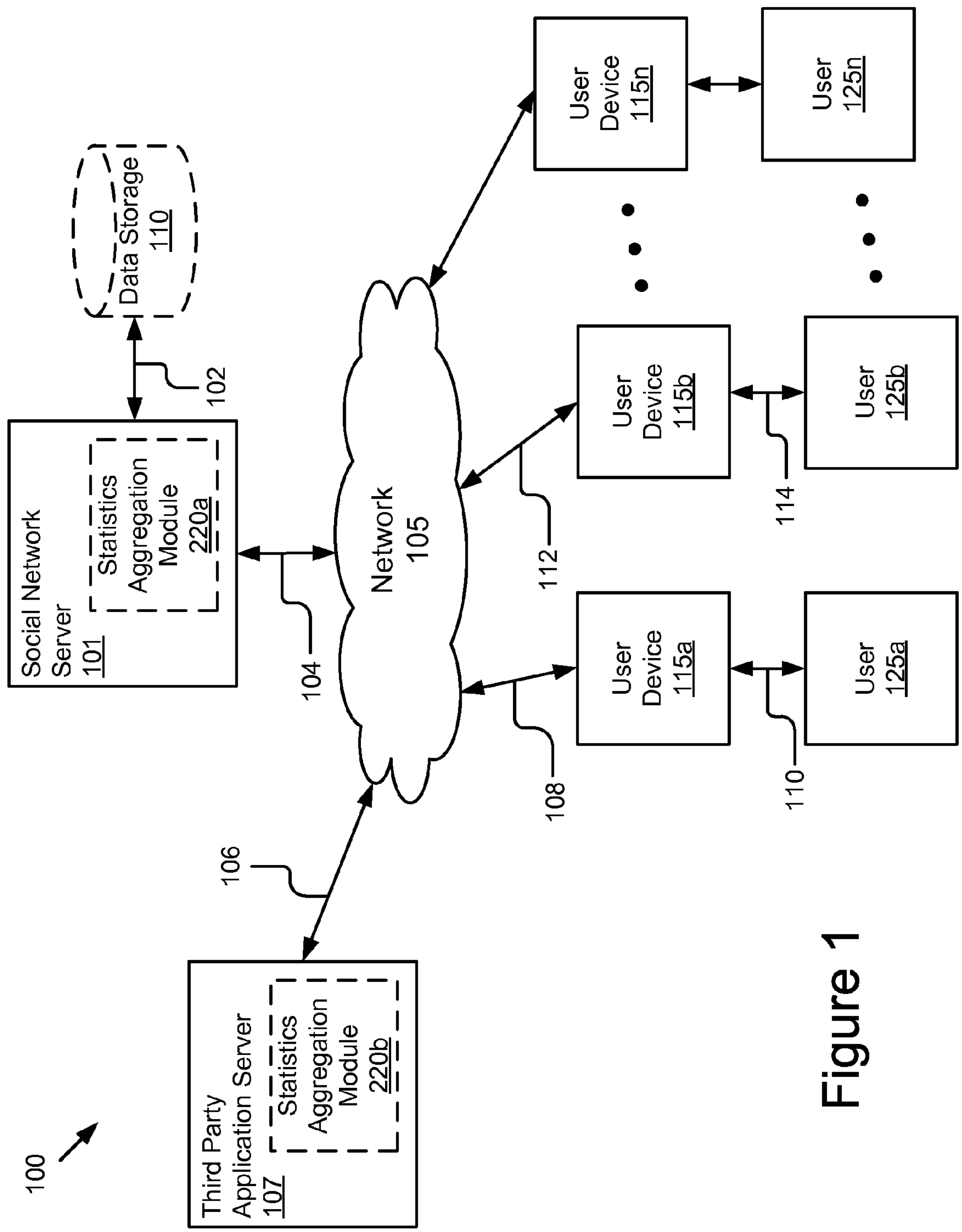
FIG. 1 illustrates a block diagram of a system for generating privacy-enhanced aggregate statistics according to one embodiment.

A system and method for generating privacy-enhanced aggregate statistics is described. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, some embodiments are described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments as described herein.

System Overview

FIG. 1 illustrates a block diagram of a social network system 100 for generating privacy-enhanced aggregate statistics according to one embodiment. In one embodiment, aggregate statistics are statements and/or assertions about preferences of a sub-group of users of the system 100. According to one embodiment, the aggregate statistic is presented in the form of "X people from group Y prefer Z," where X indicates a value (for example, number of people), Y identifies the group and Z identifies a particular set (for example, content shared within the system 100). One of ordinary skill will appreciate that the aggregate statistic may be presented in another equivalent form according to other embodiments and the formats used herein are only by way of example.

The illustrated embodiment of the social network system 100 for generating privacy-enhanced aggregate statistics includes user devices 115*a*, 115*b* that are accessed by users 125*a*, 125*b*, a social network server 101 and a third party server 107. In the illustrated embodiment, these entities are communicatively coupled via a network 105. Although only three devices are illustrated, persons of ordinary skill in the art will recognize that any number of user devices 115*n* is available to any number of users 125*n*.

The user devices 115*a*, 115*b*, 115*n* in FIG. 1 are used by way of example. While FIG. 1 illustrates three devices, the present embodiment applies to any system architecture having one or more user devices and one or more user application servers. Furthermore, while only one network 105 is coupled to the user devices, 115*a*, 115*b*, 115*n* the social network server 101 and the third party server 107, in practice any number of networks 105 can be connected to the entities. Furthermore, while only one third party application server 107 is shown, the system 100 could include one or more third party application servers 107. Additionally, while only one social network server 101 is shown, the system 100 could include any number of social network servers 101.

The network 105 enables communications between user devices 115*a*, 115*b*, 115*n*, the social network server 101, the third party application 107 and user application servers 130*a*, 130*b*, 130*n*. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one embodiment, the network 105 is an IP-based wide or metropolitan area network.

In some embodiments, the network 105 helps to form a set of online relationships between users 125*a*, 125*n*, such as provided by one or more social networking systems, such as social network system 100, including explicitly-defined relationships and relationships implied by social connections with other online users, where the relationships form a social graph. In some examples, the social graph can reflect a mapping of these users and how they are related.

In one embodiment, a statistics aggregation module 220*a* is included in the social network server 101 and is operable on the social network server 101. In another embodiment, the statistics aggregation module 220*b* is included in the third party application server 107 and is operable on a third party application server 107. Persons of ordinary skill in the art will recognize that the statistics aggregation module 220 can be stored in any combination on the devices and servers. In some embodiments the statistics aggregation module 220*a*/220*b* includes multiple, distributed modules that cooperate with each other to perform the functions described below. Details describing the functionality and components of the statistics aggregation module 220*a* of the social network server 101 are explained in further detail below with reference to FIG. 3A.

In the illustrated embodiment, the user devices 115*a*, 115*b* are coupled to the network 105 via signal lines 108 and 112, respectively. The user 125*a* is communicatively coupled to the user device 115*a* via signal line 110. Similarly, the user device 115*b* is coupled to the network via signal line 112. The user 125*b* is communicatively coupled to the user device 115*b* via signal line 114. The third party application 107 is communicatively coupled to the network 105 via signal line 106. The social network server 101 is communicatively coupled to the network 105 via signal line 104. In one embodiment, the social network server 101 is communicatively coupled to data storage 110 via signal line 102.

In one embodiment, data storage 110 stores data and information of users 125*a*/125*n* of the social network system 100. Such stored information includes user profiles and other information identifying the users 125*a*/125*n* of the social network system 100. Examples of information identifying users includes, but is not limited to, the user's name, contact information, sex, relationship status, likes, interests, links, education and employment history, location, political views, and religion. In one embodiment, the information stored in data storage 110 also includes the user's list of current and past friends and the user's activities within the social network system 100, such as anything the user posts within the social network system 100 and any messages that the user sends to other users. In another embodiment, the data storage 110 stores the data and information associated with the activity of the social network server 101. Such information may include user preference information. In some embodiments, the data storage includes users' affinity groups. An affinity group includes any number of people that share something in common. For example, a work group is composed of employees. An affinity group is established either explicitly or is inferred. An explicit affinity group is established by defining the group, such as by establishing a college friend group that is composed of people that went to college together.

In one embodiment, which will be discussed below, a storage device 214 (see FIG. 2) is included in the social network server 101 and storage 214 stores the data and information of users 125*a*/125*n* of the social network system 100. In one embodiment, the storage device 214 stores the information discussed above in relation to the information stored in the data storage 110.

In one embodiment, the user device 115*a*, 115*n* is an electronic device having a web browser for interacting with the social network server 101 via the network 105 and is used by user 125*a*, 125*n* to access information in the social network system 100. The user device 115*a*, 115*n* can be, for example, a laptop computer, a desktop computer, a tablet computer, a mobile telephone, a personal digital assistant (PDA), a mobile email device, a game console or player, a portable game player, a portable music player, a portable music player, or any other electronic device capable of accessing a network.

In one embodiment, the user application servers 130*a*, 130*b* are servers that provides varies services. Specifically, the user application servers 130*a*, 130*b* are servers that enable users of the social network system 100 to share information with other users of the social network system 100. For example, user applications servers 130*a*, 130*b*, 130*n* are servers that provide services such as the following: social networking; online blogging; organizing online calendars; creating, editing and sharing online calendars; sharing pictures; email services; creating and sharing websites; online chatting; sharing videos; online gaming; and any other services that allow users to display and present information on the network 105. For example, in one embodiment, user application server 130*a* is a second social network server; user application server 130*b* is a third social network server; and user application server 130*n* is a fourth social network server. To illustrate in another example, according to another embodiment, the user applications server 130*a* is an email server; user applications server 130*a* is a photo sharing server; and user applications server 130*a* is a second social network server.

Social Network Server 101

Figure 2:
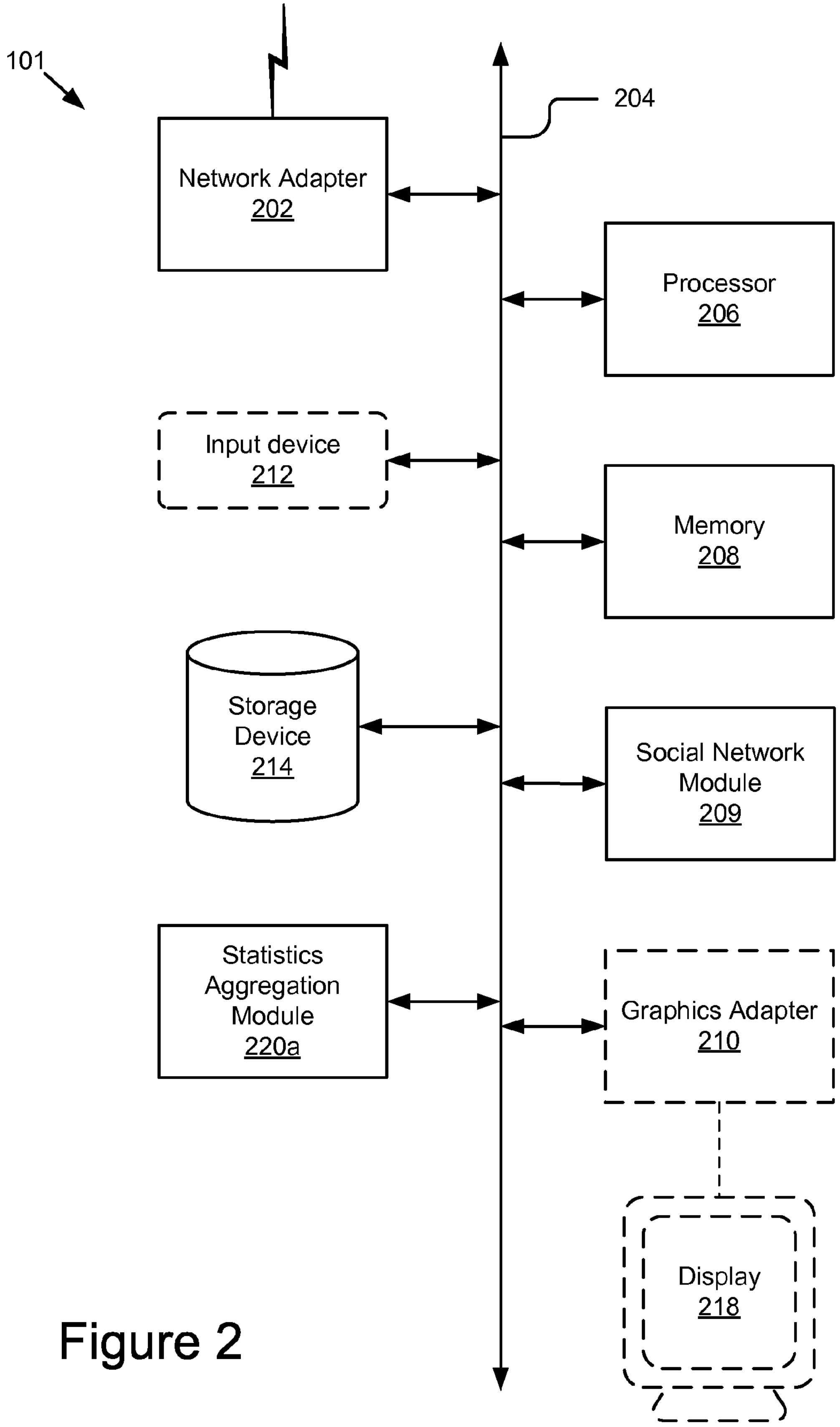
FIG. 2 is a block diagram of an embodiment of a social network server in accordance with one embodiment.

FIG. 2 is a block diagram of an embodiment of a social network server 101 in accordance with one embodiment. As illustrated in FIG. 2, social network server 101 includes a network adapter 202 coupled to a bus 204. The network adapter 202 couples the social network server 101 to a local or wide area network. According to one embodiment, also coupled to the bus 204 are at least one processor 206, memory 208, a social network module 209, an optional graphics adapter 210, an optional input device 212, a storage device 214, and a statistics aggregation module 220*a*. In one embodiment, the functionality of the bus 204 is provided by an interconnecting chipset. The social network server 101 also includes an optional display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101 also includes an operating system executable by the processor such as but not limited to WINDOWS®, MacOS X, Android, or UNIX® based operating systems. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 208 stores instructions and/or data that may be executed by processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the social network server 101. The memory 208 is coupled to the bus 204 for communication with the other components via signal line 238.

The social network server 101 also contains a social network module 209. Although only one social network server 101 is shown, persons of ordinary skill in the art will recognize that multiple hardware servers may be present. A social network is any type of social structure where the users are connected by a common feature. Examples include, but are not limited to, Orkut, Buzz, blogs, microblogs, and Internet forums. The common feature includes friendship, family, a common interest, etc. The common feature includes friendship, family, work, an interest, etc.

The social network module 209 is software and routines executable by the processor 206 to control the interaction between the social network system 101, storage device 214 and the user device 115*a*, 115*b*, 115*n*. An embodiment of the social network module 209 allows users 125*a*, 125*b* of user devices 115*a*, 115*b*, 115*n* to perform social functions between other users 125*a*, 125*b* of user devices 115*a*, 115*b*, 115*n* within the social network system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125*a*/125*n* of the social network system 100. In some embodiments, such user data is stored in storage device 214. In other embodiments, such user data is stored in data storage 110. In yet other embodiments, the user data is stored both is storage device 214 and data storage 110.

The optional input device 212 may include a mouse, track ball, or other type of pointing device to input data into the social network server 101. The input device 212 may also include a keyboard, such as a QWERTY keyboard. The input device 212 may also include a microphone, a web camera or similar audio or video capture device.

The optional graphics adapter 210 displays images and other information on the display 218. The display 218 is a conventional type such as a liquid crystal display (LCD) or any other similarly equipped display device, screen, or monitor. The display 318 represents any device equipped to display electronic images and data as described herein.

The statistics aggregation module 220*a* is software and routines executable by the processor 206 to control the interaction and exchange of information between user devices 115*a*/115*b*/115*n* and the social network server 101 or third party application server 107. Specifically, an embodiment of the statistics aggregation module 220*a* is software and routines executable by the processor 206 to generate privacy-enhanced aggregate statistics to be displayed on the user devices 115*a*/115*b*/115*n*. Details describing the functionality and components of the statistics aggregation module 220*a* will be explained in further detail below with regard to FIG. 3A.

Those skilled in the art will recognize that in alternate embodiments, the social network server 101 can have different and/or other components than those shown in FIG. 2. In addition, the social network server 101 can lack certain illustrated components. In one embodiment, a social network server 101 lacks an input device 212, graphics adapter 210, and/or display 218. Moreover, the storage device 214 can be local and/or remote from the social network server 101 (such as embodied within a storage area network (SAN)).

The social network server 101 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Statistics Aggregation Module 220

Figure 3A:
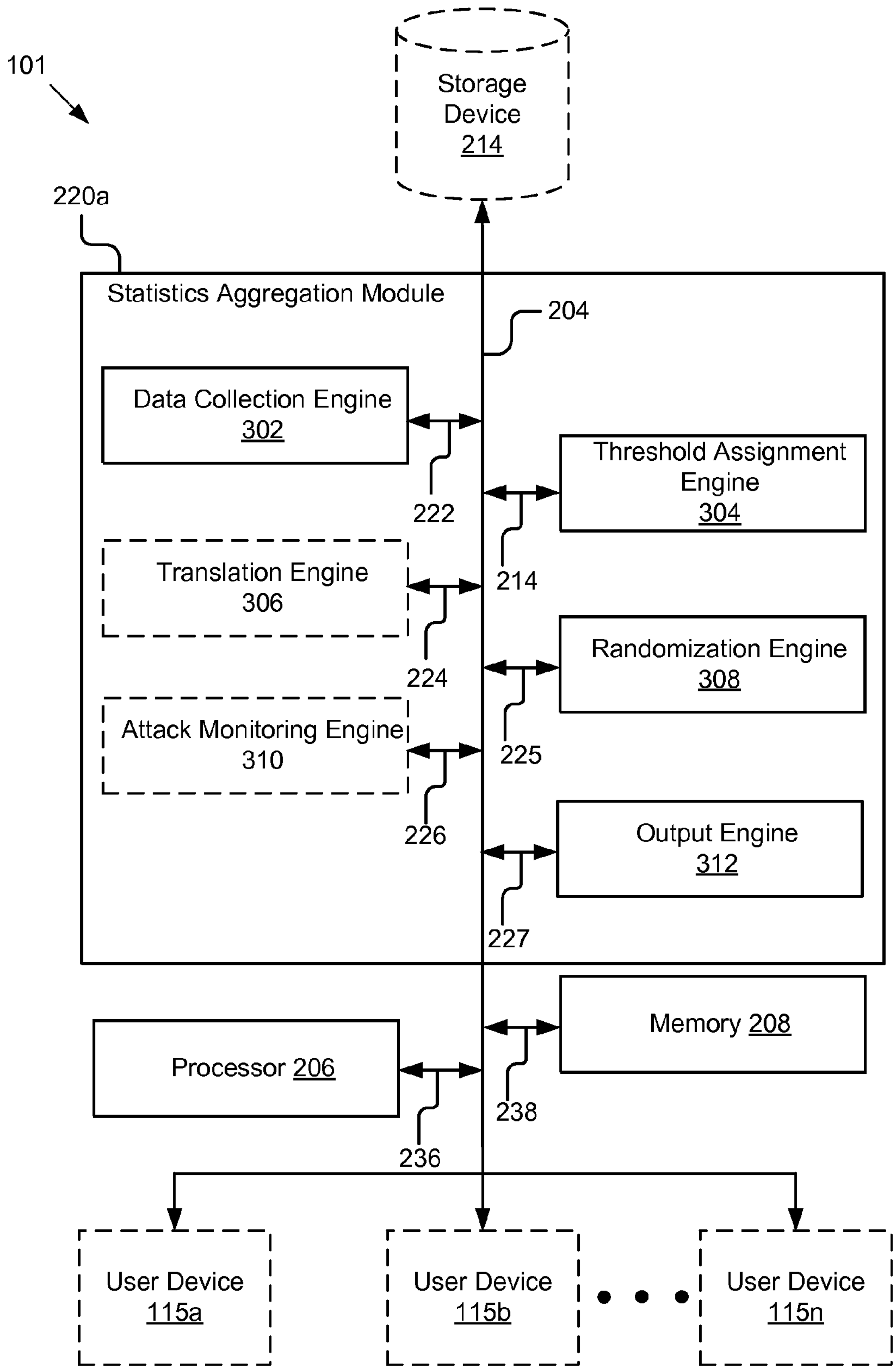
FIG. 3A is a block diagram illustrating statistics aggregation according to one embodiment.

Referring now to FIG. 3A, the statistics aggregation module 220*a* is shown in more detail. FIG. 3A is a block diagram of a portion of the social network server 101 that includes the statistics aggregation module 220*a*, a processor 206 and a memory 208, along with other modules and components recited in the description of FIG. 2. In another embodiment, the third party application server 107 includes the statistics aggregation module 220*b*. In another embodiment, the statistics aggregation module 220*a* is software and routines executable by the processor 206 to generate privacy-enhanced aggregate statistics to be displayed on the user devices 115*a*/115*b*/115*n*. For the purposes of describing the components and functionality of the statistics aggregation module 220*a*/220*b*, the below description describes the statistics aggregation module 220*a*. However, one of ordinary skill in the art will appreciate that the same description will also be applicable to the functionality and components of statistics aggregation module 220*b*. Further, in some embodiments, the components of the statistics aggregation module 220*a* are integrated into the social network module 209 (not shown). In other embodiments, the components of the statistics aggregation module 220*a* are integrated into the third party application server 107.

In one embodiment, the statistics aggregation module 220*a* comprises a data collection engine 302, a threshold assignment engine 304, a translation engine 306, a randomization engine 308, an attack monitoring engine 310 and an output engine 312.

The data collection engine 302 is software and routines executable by the processor for the collection and processing of data from the storage device 214 of the social network server 101. In some embodiments, data is collected from data storage 110 of the social network system 100. In one embodiment, the data collection engine 302 is a set of instructions executable by the processor 206 to provide the functionality described below for collection data from a database within the social network system 100. In another embodiment, the data collection engine 302 is stored in the memory 208 of the social network server 101 and is accessible and executable by the processor 206. In either embodiment, data collection engine 302 is adapted for cooperation and communication with the processor 206 and other components of the social network server 101 via signal line 222.

According to one embodiment, the data collection engine 302 is communicatively coupled to the storage device 214 via bus 204. In one embodiment, the data collection engine 302 collects data from the storage device 214. The collected data includes data associated with user inputs and user activity within the social network system 100 via the social network server 101. In some embodiments, user inputs and user activity includes preferences indications that a user had made with regard to various content within the system 100. For example, in one embodiment, if a news article is shared within the system 100, the social network module 209 of the social network server 101 provides the ability for users to indicate that they enjoyed reading that article by providing a button or other tool for making the preference indication. In some embodiments, an option to highlight preferred content is provided as a tool for making the preference indication. Thus, users are able to input information into the system 100 and indicate preferences for various content displayed or shared in the system 100 via the social network server 101.

In one embodiment, the user information, including the user inputs and the user preference indications are collected and processed to display aggregate statistics for the preference indications. In one embodiment, the data collection engine 302 also processes the collected data. The data is organized into groups over which aggregate statistics will be generated and identifies the content in each group about which the aggregate statistic will be reported. A group is a collection or set of users who share a common characteristic or multiple common characteristics.

Figure 3B:
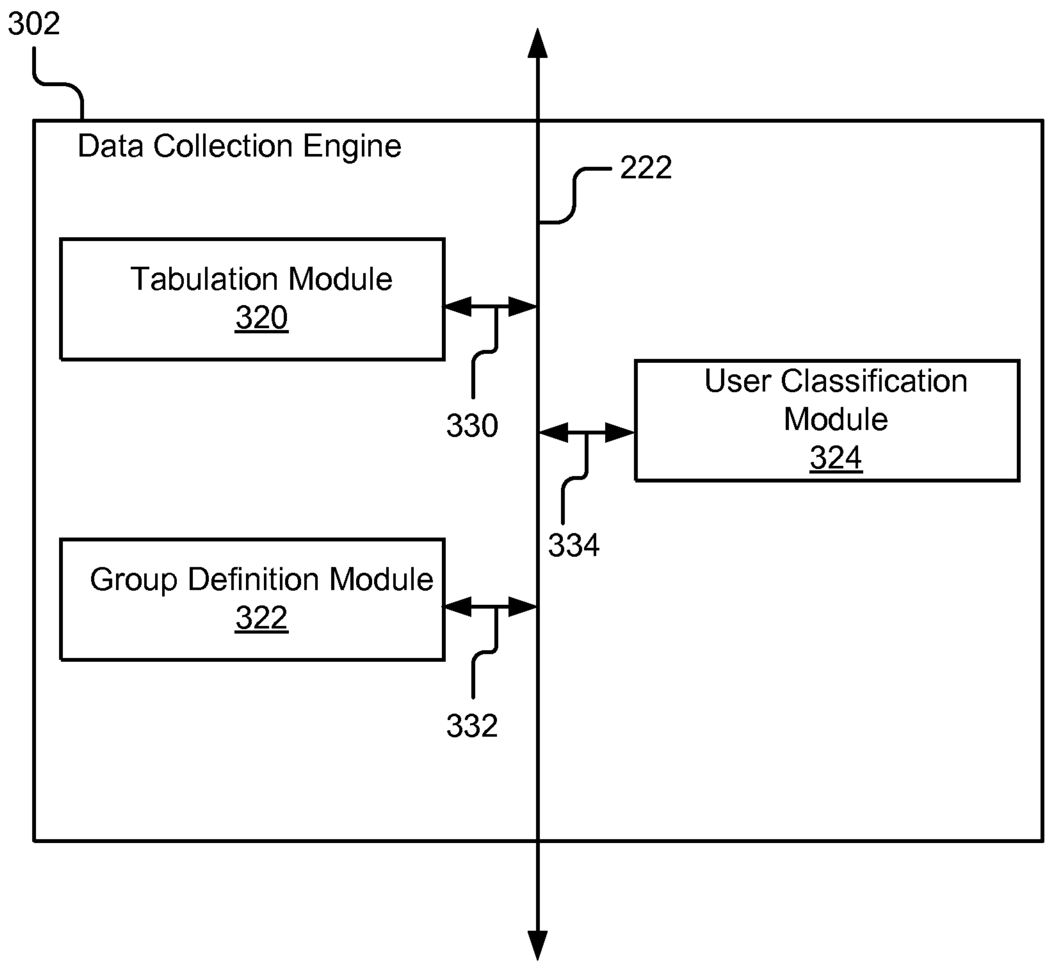
FIG. 3B is a block diagram illustrating data collection according to one embodiment.

Turning now to FIG. 3B, the data collection engine 302 is shown in more detail. In some embodiments, the data collection engine 302 includes a tabulation module 320, a group definition module 322 and a user classification module 324.

In one embodiment, the tabulation module 320 is software and routines executable by the processor for collecting and tabulating user data for further organization and aggregation. In one embodiment, the tabulation module 320 is a set of instructions executable by the processor 206 to provide the functionality described below for collecting and tabulating user data for further organization and aggregation. In another embodiment, the tabulation module 320 is stored in the memory 208 of the social network server 101 and is accessible and executable by the processor 206. In either embodiment, the tabulation module 320 is adapted for cooperation and communication with the processor 206 and other components of the data collection engine 302 via signal line 330.

According to one embodiment, the tabulation module 320 collects and tabulates user data for a subset of users. In some embodiments, the tabulation module 320 determines a random subset of users and tabulates the user data for the subset.

According to some embodiments, the group definition module 322 determines the definitions and criteria for the groups. In one embodiment, group definition module 322 is software and routines executable by the processor for determining the definitions and criteria for the groups. In one embodiment, the group definition module 322 is a set of instructions executable by the processor 206 to provide the functionality described below for determining the definitions and criteria for the groups. In another embodiment, the group definition module 322 is stored in the memory 208 of the social network server 101 and is accessible and executable by the processor 206. In either embodiment, the group definition module 322 is adapted for cooperation and communication with the processor 206 and other components of the data collection engine 302 via signal line 332.

In some embodiments, the groups over which the aggregate statistics are organized are defined by the users. In other words, the users have the ability to choose and define what groups the statistics are aggregated over. In some embodiments, the groups over which the aggregate statistics are organized are defined by the system. In some embodiments, these the creation of these groups are based on behaviors of users in the system 100. In such embodiments, behaviors can include, but are not limited to: direct communication between two users (for example, communication by electronic mail), views of each other's content, or common behaviors of users (for example, a group of users who read the same article). In some embodiments, a combination of behaviors is used to define the group. As an example, a group may be created by adding users with a certain characteristic. Subsequently, users may be removed or the group may be otherwise augmented according to various behaviors of the users of the system 100.

In one embodiment, the user classification module 324 classifies users to facilitate in organization of the users into appropriate groups. In one embodiment, user classification module 324 is software and routines executable by the processor for classifying users to facilitate in organization of the users into appropriate groups. In one embodiment, the user classification module 324 is a set of instructions executable by the processor 206 to provide the functionality described below for classifying users to facilitate in organization of the users into appropriate groups. In another embodiment, the user classification module 324 is stored in the memory 208 of the social network server 101 and is accessible and executable by the processor 206. In either embodiment, the user classification module 324 is adapted for cooperation and communication with the processor 206 and other components of the data collection engine 302 via signal line 334.

The foregoing data/information is collected upon user consent. In some implementations, a user is prompted to explicitly allow data collection. Further, the user may opt in/out of participating in such data collection activities. Furthermore, the collected data can be anonymized prior to performing the analysis to obtain the various statistical patterns described in this document.

The threshold assignment engine 304 is software and routines executable by the processor for assigning at least one threshold including a criterion that will be used in making a determination on whether an aggregate statistic will be generated and what aggregate statistic will be generated. In one embodiment, the threshold assignment engine 304 is a set of instructions executable by the processor 206 to provide the functionality described below for assigning at least one threshold including a criterion that will be used in making a determination on what aggregate statistic will be generated. In another embodiment, the threshold assignment engine 304 is stored in the memory 208 of the social network server 101 and is accessible and executable by the processor 206. In either embodiment, the threshold assignment engine 304 is adapted for cooperation and communication with the processor 206 and other components of the social network server 101 via signal line 224.

According to one embodiment, the threshold assignment engine 304 assigns a threshold including a criterion that will be used in making a determination on whether an aggregate statistic will be generated and if so, how the aggregate statistics will be generated and sent for display. In one embodiment, the threshold is a specific number. For example, in one embodiment, one threshold may be "less than 10%." According to another embodiment, one threshold is "more than 30%." In another embodiment, the threshold is a range of values. For example, in one embodiment, one threshold is "between 10% and 15%." In some embodiments, the numerical value of the assigned threshold is then translated into a qualitative descriptor.

As a specific illustration, if we look at a defined group of people, for example, the student population of Stanford University, we can collect statistics about various information about the preferences of that student population. For example, one aggregate statistics may show 12% of students in that population like an article about strict parenting that was posted on a social networking website. The threshold assignment engine 304 assigns a criterion that will be used in making a determination on whether an aggregate statistic will be generated and if so, how the aggregate statistics will be generated and sent for display. In this example, if the threshold is "between 10% and 15%," according to some embodiments, the system translates the numerical value into a qualitative descriptor to display that "some student of Stanford University like the article about strict parenting."

The translation engine 306 is software and routines executable by the processor for translating a quantitative value or a range of quantitative values into a qualitative descriptor. In one embodiment, the translation engine 306 is a set of instructions executable by the processor 206 to provide the functionality described below for translating a quantitative value or a range of quantitative values into a qualitative descriptor. In another embodiment, the translation engine 306 is stored in the memory 208 of the social network server 101 and is accessible and executable by the processor 206. In either embodiment, the translation engine 306 is adapted for cooperation and communication with the processor 206 and other components of the social network server 101 via signal line 225.

According to one embodiment, the translation engine 306 translates quantitative values into descriptors that identify relative amounts. Examples of such descriptors include, but are not limited to, "few," "some," "several," "most," "many," "at least a quarter," "about half of," and "greater than X %." In some embodiments, these descriptors indicate relative increase in value—where "few" indicates the least amount while "many" indicates the most amount. The translation engine 306 translates the quantitative threshold values to associated qualitative descriptors. For example, in one embodiment, a threshold of "at least 10%" translates into a qualitative descriptor of "some." In this embodiment, the aggregate statistic is reported out as "some people in group Y prefer Z." As another example, in another embodiment, a threshold of "more than 30%" translates into a qualitative descriptor of "many." In this embodiment, the aggregate statistic is reported out as "many people in group Y prefer Z."

The randomization engine 308 is software and routines executable by the processor for adding noise. In one embodiment, the randomization engine 308 is a set of instructions executable by the processor 206 to provide the functionality described below for adding noise to the assigned threshold. In another embodiment, the randomization engine 308 is a set of instructions executable by the processor 206 to provide the functionality described below for adding noise to the quantitative value. In yet another embodiment, the randomization engine 308 is a set of instructions executable by the processor 206 to provide the functionality described below for adding noise to the collected data. In another embodiment, randomization engine 308 is stored in the memory 208 of the social network server 101 and is accessible and executable by the processor 206. In either embodiment, the randomization engine 308 is adapted for cooperation and communication with the processor 206 and other components of the social network server 101 via signal line 214.

According to one embodiment, the randomization engine 308 adds noise to the assigned threshold. The threshold is randomized around a base value for privacy reasons. As an example, a threshold may have a base value of 25%. Noise is added to the base value in order to increase the range where a statistic may still qualify to meet the threshold. For example, noise may be added so that the threshold is 20 at one time and 30 at another time. In various embodiments, different types of noise may be added. In one embodiment, the type of noise that is added is Laplace noise. In another embodiment, the type of noise that is added is uniform noise. One of ordinary skill in the art will appreciate that the aforementioned probability distributions are mentioned by way of example to illustrate how noise is selected according to various embodiments, and in other embodiments, noise may be selected according to any probability distribution.

According to another embodiment, the randomization engine 308 adds noise to the quantitative value. In such embodiments, the assigned threshold is fixed. The noise-modified quantitative value is compared against the fixed threshold. In other embodiments, the randomization engine 308 adds noise to the collected data.

In one embodiment, the statistics aggregation module 220*a* also includes an optional attack monitoring engine 310. In such embodiments, the attack monitoring engine 310 software and routines executable by the processor for detecting adversarial behavior. In one embodiment, the attack monitoring engine 310 is a set of instructions executable by the processor 206 to provide the functionality described below for detecting adversarial users based in user behavior. In another embodiment, the attack monitoring engine 310 is stored in the memory 208 of the social network server 101 and is accessible and executable by the processor 206. In either embodiment, the attack monitoring engine 310 is adapted for cooperation and communication with the processor 206 and other components of the social network server 101 via signal line 226.

The optional attack monitoring engine 310 detects adversarial users based on user behavior and sends information to the output engine regarding whether these indications are present. In other words, the attack monitoring engine 310 detected adversarial users and indications that an adversarial user is attempting to continuous modify data in the system 100 in order to identify users associated with the collected and processed data. A check is performed before a statistic is generated to ensure that there has been enough change to necessitate a new statistic. Various users inputs are various types of user activity may indicate adversarial behavior.

In one embodiment, manipulation of profiles indicates adversarial behavior. In another embodiment, continuous manipulation of affinity groups, i.e. constant deletion or addition of members, indicates adversarial behavior. According to yet other embodiments, manipulation of preferences for one or more users indicates adversarial behavior. In some embodiments, repeated views of web pages or other online content indicates adversarial behavior. In other embodiments, creation of a large number of accounts within a short period of time from the same IP address indicates adversarial behavior. In other embodiments, creation of a large number of accounts within a short period of time from the same geographical location indicates adversarial behavior. According to yet other embodiments, a sudden and dramatic change in user behavior indicates adversarial behavior. To illustrate, some examples that would indicate a sudden or dramatic change in user behavior may be a sudden or dramatic change in frequency of use of the social network, a change in time of day of use of the social network, or a change in the types of content viewed and or consumed.

In some embodiments, various combinations of the above-mentioned adversarial behavior indicators are used to determine the presence of adversarial behavior. Once the attack monitoring engine 310 makes a determination on whether there is a presence or indication of adversarial behavior, the attack monitoring engine 310 sends this information to the output engine 312.

The statistics aggregation module 220*a* also includes an output engine 312. In such embodiments, the output engine 312 is software and routines executable by the processor for generating aggregate statistic information and sending the information for display on the user device 115*a*/115*b*/115*n*. In one embodiment, the output engine 312 is a set of instructions executable by the processor 206 to provide the functionality described below for generating aggregate statistic information and sending the information for display on the user device 115*a*/115*b*/115*n*. In another embodiment, the output engine 312 is stored in the memory 208 of the social network server 101 and is accessible and executable by the processor 206. In either embodiment, the output engine 312 is adapted for cooperation and communication with the processor 206 and other components of the social network server 101 via signal line 227.

The output engine 312 generates aggregate statistic information and sends the information for display on the user device 115*a*/115*b*/115*n*. In some embodiments, the output engine 312 determines whether an aggregate statistic is generated based on the criterion. For example, if the collected data does not fall within the threshold, then an aggregate statistics will not be generated or sent for display. In some embodiments, if the output engine 312 receives information indicating the presence of adversarial behavior, the output engine 312 sends previously-sent aggregate statistic information for display. In other embodiments, if the output engine 312 receives information indicating the presence of adversarial behavior, the output engine 312 performs additional or other steps, such as limiting or controlling the network traffic between the system and the potential adversarial user, requiring some out-of-band communication between the system and the potential adversarial user, or any combination of the aforementioned steps.

Method

Figure 4A:
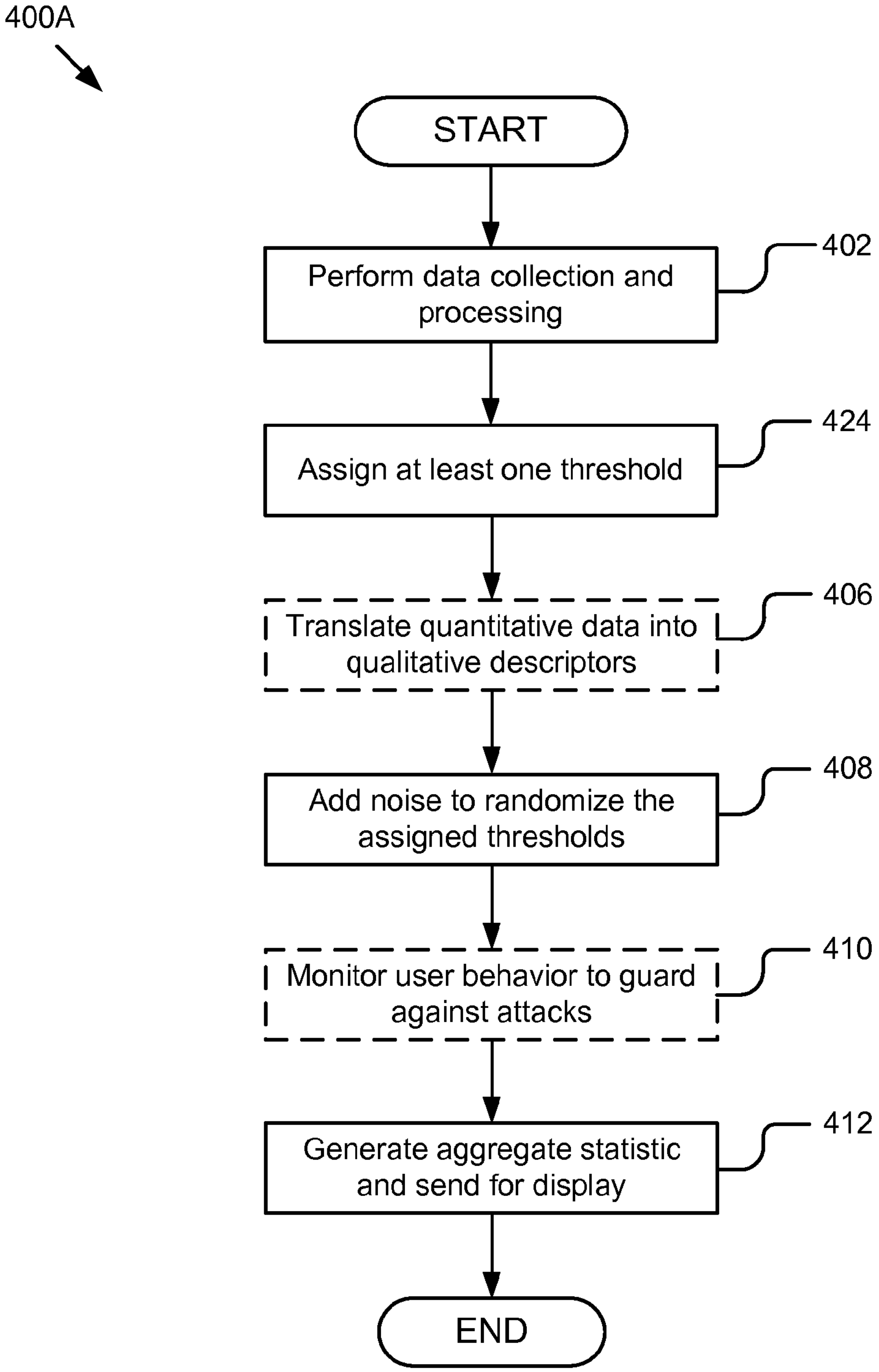
FIG. 4A is a flow chart illustrating a method for generating privacy-enhanced aggregate statistics in accordance with one embodiment.
Figure 5:
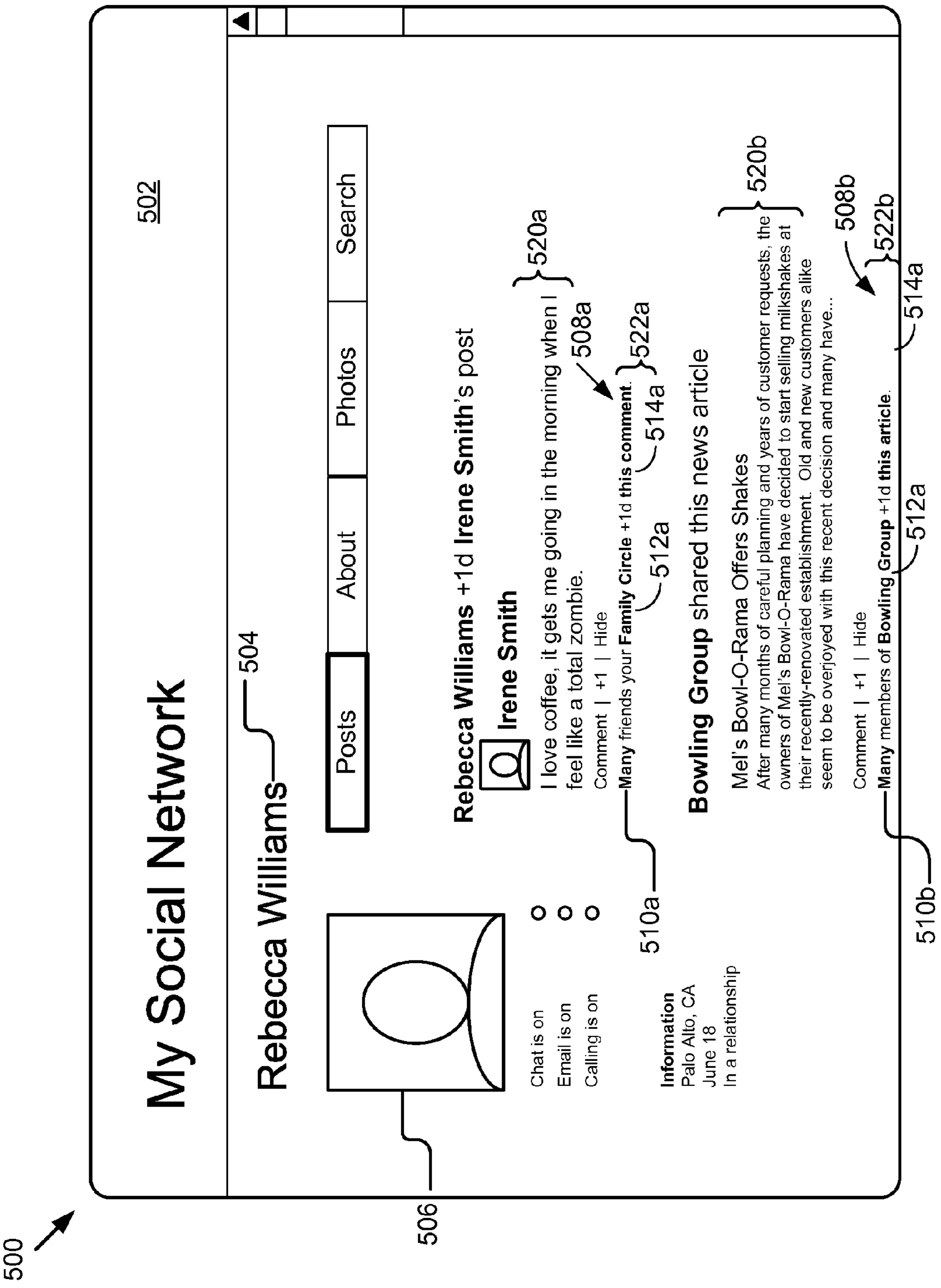
FIG. 5 is a graphic representation of an example of a user interface showing the display of aggregate statistics on a webpage of a social network service according to one embodiment.

Referring now to FIG. 4A, a flow chart illustrating an embodiment of a method 400A for generating privacy-enhanced aggregate statistics is shown. Data collection and processing is performed 402 by the data collection engine 302 of the statistics aggregation module 220*a* in order to gather information in order to generate the aggregate statistics. At least one threshold is assigned 424 by the threshold assignment module 304 of the statistics aggregation engine 220*a*. The threshold includes a criterion that will be used in making a determination on what aggregate statistic will be generated. In some embodiments, the threshold is a numerical value. The numerical value, or quantitative data is then translated 406 into qualitative descriptors by the translation engine 306. As stated above, examples of such descriptors include, but are not limited to, "few," "some," "several," "most," "many," "at least a quarter," "about half of," and "greater than X %." In some embodiments, noise is then added 408 to randomize the assigned threshold by the randomization engine 308. In another embodiment, noise is added to the collected data (not shown). Checks to guard against attacks from adversarial users are performed 410. Examples of indications of adversarial behavior include, but are not limited to, manipulation of profiles, continuous manipulation of affinity groups, and manipulation of preferences for one or more users. The threshold is applied and aggregate statistics are generated and sent for display 412. In one embodiment, as illustrated in FIG. 5 below, the aggregate statistic information is generated and sent for display on a portion of a user's social network webpage. In another embodiment, the aggregate statistic information is sent for display as a pop-up window on a user's social network webpage.

Figure 4B:
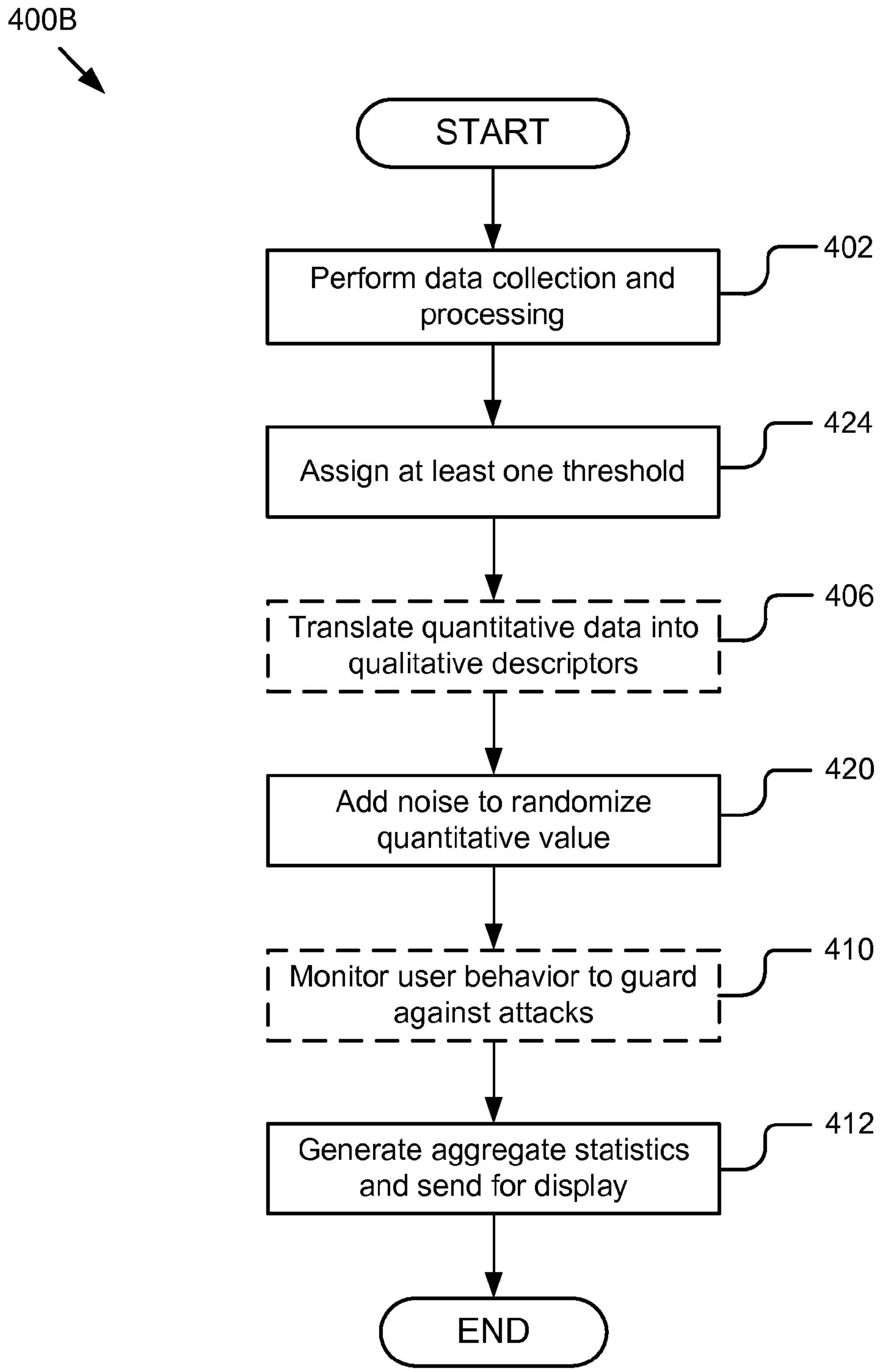
FIG. 4B is a flow chart illustrating a method for generating privacy-enhanced aggregate statistics in accordance with another embodiment.

As shown in FIG. 4B, according to another embodiment, the randomization engine 308 adds noise 420 to the quantitative value. In such embodiments, the assigned threshold is fixed. The noise-modified quantitative value is compared against the fixed threshold.

Graphical User Interface

FIG. 5 is a graphic representation of an example of a user interface 500 showing the display of aggregate statistics on a social network webpage 502 of a social network service according to one embodiment. According to the illustrated embodiment, the webpage 502 includes a user name 504 and user profile picture 502. The webpage 502 is displaying the posts page of a user's social network site. The webpage 502 includes a content information region 520*a*/520*b* for displaying content on the webpage. According to this embodiment, the aggregate statistic information 508*a*/508*b* is displayed on a portion 522*a*/522*b* (an aggregate statistics information region 522*a*/522*b*) of a user's social network webpage 502. The aggregate statistic information region 522*a*/522*b* includes a qualitative descriptor 510*a* and aggregate statistic information 508*b* includes a qualitative descriptor 510*b*. The aggregate statistic information 508*a*/508*b* also includes subset 512*a*/512*b* and content 514*a*/514*b*.

Figure 6:
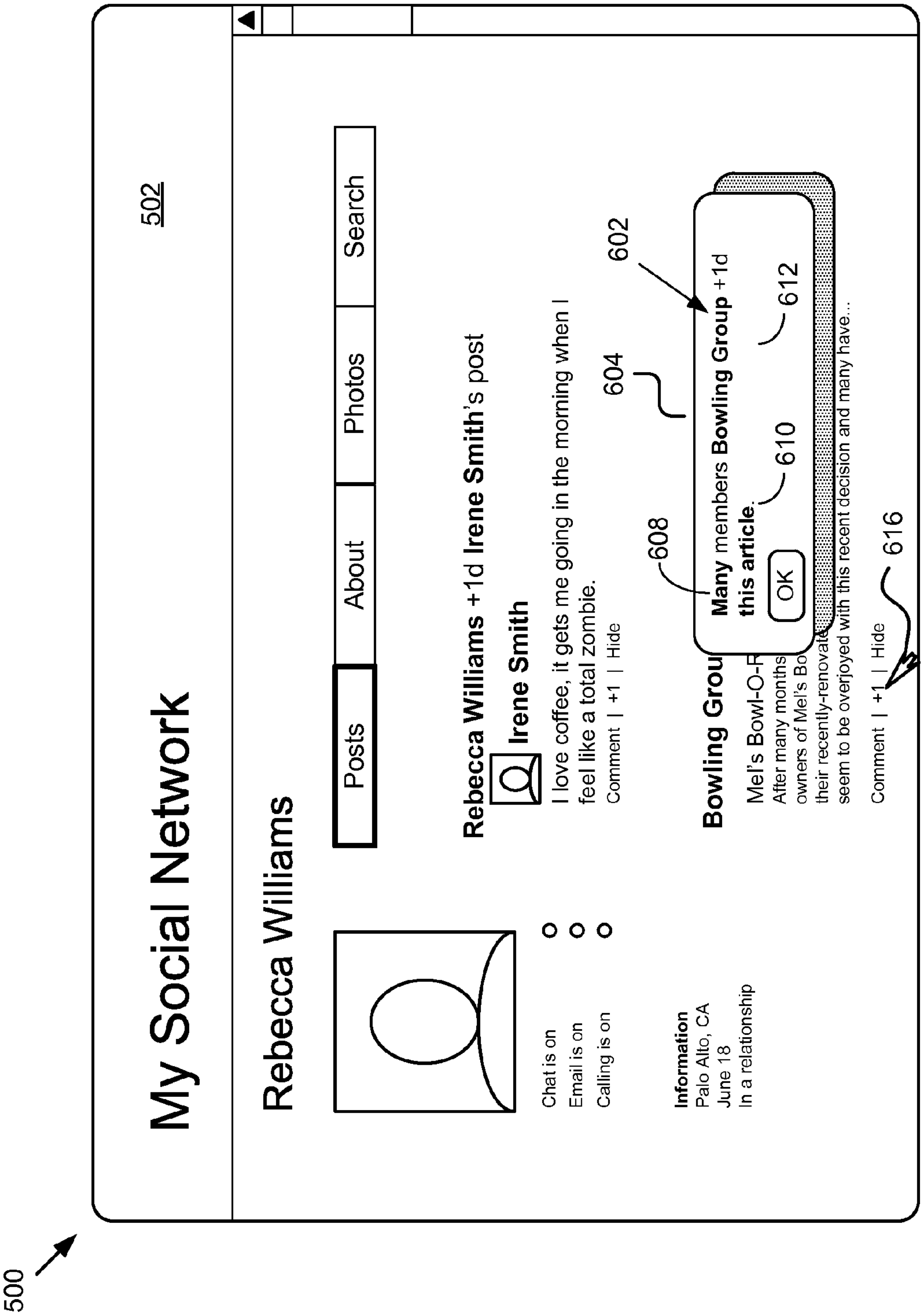
FIG. 6 is a graphic representation of an example of a user interface showing the display of aggregate statistics on a webpage of a social network service according to another embodiment.

FIG. 6 is a graphic representation of an example of the user interface 600 showing the display of aggregate statistics on the webpage 502 of a social network service according to another embodiment. The webpage 502 is displaying the aggregate statistic information 602 in pop-up window 604. In one embodiment, when pointer 606 mouses over the "+1" selection, the pop-up window 604 is displayed.

The foregoing description of the embodiments has been presented for the purposes of illustration and description. It is not intended to be exhaustive or to limit the embodiment to the precise form disclosed. Many modifications and variations are possible in light of the above teaching. It is intended that the scope be limited not by this detailed description, but rather by the claims of this application. As will be understood by those familiar with the art, the embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the embodiments or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, of the embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure of the embodiments are intended to be illustrative, but not limiting, of the scope of the embodiments, which is set forth in the following claims.

What is claimed is:

1. A computer-implemented method for generating privacy-enhanced aggregate statistics, the method comprising:

collecting data, wherein the collected data includes information related to inputs from users in a social network system;

classifying the collected data into at least one group, each group identifying a set of users sharing a common characteristic;

assigning a threshold, wherein the threshold includes a criterion for making a determination on generation of an aggregate statistic and wherein the criterion is associated with a quantitative value based on the collected data;

translating the quantitative value into a qualitative descriptor;

adding noise;

determining whether to generate the aggregate statistic based on the criterion; and responsive to determining to generate the aggregate statistic, generating the aggregate statistic, the aggregate statistic including the qualitative descriptor and the at least one group, the qualitative descriptor representing a quantitative portion of the at least one group.

2. The method of claim 1, wherein adding noise includes adding noise to the assigned threshold to randomize the assigned threshold.

3. The method of claim 1, wherein adding noise includes adding noise to the collected data.

4. The method of claim 1, wherein adding noise includes adding noise to the quantitative value.

5. The method of claim 1, wherein the noise added is Laplace noise.

6. The method of claim 1, wherein the noise added is uniform noise.

7. The method of claim 1, further comprising:

detecting the presence of adversarial users based on user behavior; and generating the aggregate statistic based on the presence of adversarial users.

8. The method of claim 1, wherein the user inputs include user preference indications.

9. The method of claim 7, wherein detecting the presence of adversarial users includes determining a minimum number of changes in user input to ensure that there has been enough change to necessitate a new statistic.

10. A system for generating privacy-enhanced aggregate statistics, the system comprising:

a processor; and at least one module, stored in the memory and executed by the processor, the at least one module including instructions for:

collecting data, wherein the collected data includes information related to inputs from users in a social network system;

classifying the collected data into at least one group, each group identifying a set of users sharing a common characteristic;

assigning a threshold, wherein the threshold includes a criterion for making a determination on generation of an aggregate statistic and wherein the criterion is associated with a quantitative value based on the collected data;

translating the quantitative value into a qualitative descriptor;

adding noise;

determining whether to generate the aggregate statistic based on the criterion; and responsive to determining to generate the aggregate statistic, generating the aggregate statistic, the aggregate statistic including the qualitative descriptor and the at least one group, the qualitative descriptor representing a quantitative portion of the at least one group.

11. The system of claim 10, wherein adding noise includes adding noise to the assigned threshold to randomize the assigned threshold.

12. The system of claim 10, wherein adding noise includes adding noise to the collected data.

13. The system of claim 10, wherein adding noise includes adding noise to the quantitative value.

14. The system of claim 10, wherein the noise added is Laplace noise.

15. The system of claim 10, wherein the noise added is uniform noise.

16. The system of claim 10 further comprising:

instructions for detecting the presence of adversarial users based on user behavior; and generating the aggregate statistic based on the presence of adversarial users.

17. The system of claim 10 wherein the user inputs include user preference indications.

18. The system of claim 16 wherein detecting the presence of adversarial users includes determining a minimum number of changes in user input to ensure that there has been enough change to necessitate a new statistic.

19. A computer program product comprising a non-transitory computer-readable medium including instructions that, when executed by a computer, cause the computer to perform the steps comprising:

collecting data, wherein the collected data includes information related to user inputs from users in a social network system;

classifying the collected data into at least one group, each group identifying a set of users sharing a common characteristic;

generating a content information region for displaying content on a social network web site; and generating an aggregate statistic information region adjacent to the content information region for displaying aggregate statistic information, wherein the aggregate statistic information is generated by (1) assigning a threshold, wherein the threshold includes a criterion for making a determination on generation of aggregate statistic information and wherein the criterion is associated with a quantitative value based on the collected data, (2) translating the quantitative value into a qualitative descriptor, (3) adding noise and (4) generating the aggregate statistic information based on the criterion, and the aggregate statistic information includes a qualitative descriptor representing a quantitative portion of the at least one group, the at least one group, and a description of content.

20. The computer program product of claim 19, wherein adding noise includes adding noise to the assigned threshold to randomize the assigned threshold.

21. The computer program product of claim 19, wherein adding noise includes adding noise to the collected data.

22. The computer program product of claim 19, wherein generating the aggregate statistic information region includes generating a pop-up window.

23. The computer program product of claim 22, further comprising:

receiving an input indicating a mouse-over of a portion of the aggregate statistic information region; and in response to receiving the input, displaying a pop-up window displaying additional details associated with the aggregate statistic.

* * * * *